3,488,070
TUBULAR REACTION VESSEL
Pierre Amiot, Le Vesinet, and Francois Sterna, St. Germain-en-Laye, France, assignors to Societe Anonyme dite: Societe Nationale des Petroles d'Aquitaine Courbevoie, France, a corporation of France
Filed Feb. 13, 1968, Ser. No. 705,219
Claims priority, application France, Feb. 16, 1967, 95,259; Nov. 16, 1967, 128,536
Int. Cl. F16c 55/00
U.S. Cl. 285—175          9 Claims

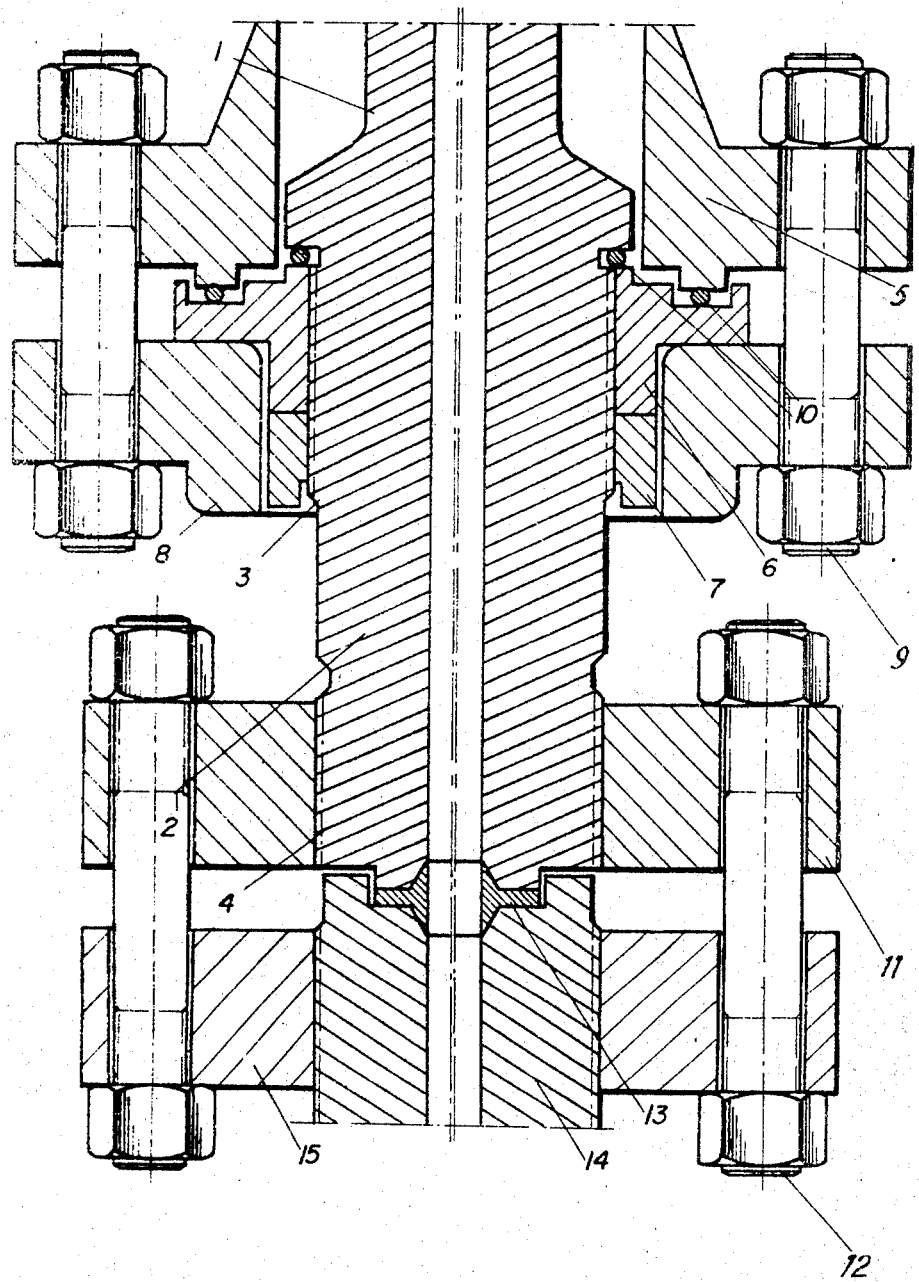

ABSTRACT OF THE DISCLOSURE

A chemical reaction vessel for carrying out reactions under high pressure and high temperature, including high-pressure tubes having increased thicknesses of metal near their ends, these thickened portions being obtained by hot forging or machining. Removable jacket-members secured on the said thickened portions enclose the major portion of the tubes and high-pressure sealing washers are provided, together with removable means for interconnecting the tubes.

---

The present invention is concerned with a vessel constituted by a succession of rectilinear or curved cylindrical tubes; the invention is particularly concerned with a reaction vessel which will enable reactions to be carried out under high pressure and at controlled temperature. In the vessel provided by the invention, the temperature is regulated by means of a fluid in an enclosure defined between the external wall of the tubular vessel and a jacket.

Hitherto, tubular vessels of this type have comprised tubes of which the inside and outside diameter is constant over the entire length thereof and on which jacket-members are permanently fixed. Also, for the purpose of connecting the tubes to each other and to the jacket-members, the ends of the tubular components have been screw-threaded, this having the effect of reducing the thickness of the tube; the thickness is, in any case, a compromise between having a relatively great thickness to resist bursting under the action of the internal pressure and having a relatively small thickness in order to obtain good heat-exchange between the medium being reacted and the temperature-controlling fluid. The provision of these screw-threaded portions has made it necessary to over-dimension the tube, which has a deleterious effect upon the heat-exchange between the reaction medium and the temperature-control fluid.

The object of the present invention is to remedy these drawbacks by providing a vessel of simple construction, all the elements of which are removable and in which the ends of the tubular components are reinforced by creating an increased thickness of metal, preferably by "upsetting" the end of the tube by hot forging.

According to the present invention there is provided a tubular vessel in which a reaction medium can flow from an inlet end to an outlet end thereof, under high pressure and at controlled temperature, comprising a series of cylindrical tubes each having dimensions such that the ratio of the outside diameter thereof to the inside diameter is in excess of 1.4, the tubes being surrounded by jacket-members and being firmly interconnected by couplings providing fluid-tight joints and the ends of the tubes being reinforced by the provision of increased thickness of metal, the couplings including threaded members which are engaged with screw-threads on the thickened portions of the tubes.

In a preferred method of constructing the vessel according to the invention, shouldered intermediate rings are screwed onto the thickened portions, fluid-sealing washers being fitted between the ends of the jacket-members and the said intermediate rings, and shouldered flange-members are fitted onto the shoulders of said intermediate rings by the use of clamping means supported by the jacket-members.

In one method of forming the reinforced ends on the tubes, the increased thicknesses of metal are obtained by a forging operation applied to a hollow tube.

In a further method of making tubes with reinforced ends, the tube are obtained by starting with solid metal billets of a diameter at least equal to that of the greatest diameter of the tube which it is required to obtain. If the diameter of the billet is in fact greater than the greatest diameter of the desired tube, the billet is first brought down to the said greatest diameter by forging its ends, the intermediate portion of the billet then being reduced, again by forging, to the diameter desired for the main run of the finished tube. In this way a solid bar is obtained, the outside dimensions of which correspond to those of the tube to be produced. All that is then needed is to bore the tube, if necessary leaving the thickness of the tube somewhat increased towards the interior, to allow for any necessary grinding or surface-treatment to be carried out.

The choice of the method which is used for obtaining a tube with its ends having a greater outside diameter than the outside diameter of the main run thereof, depends upon the general dimensions of the tube. The tubes can undergo any finishing and machining operations made necessary by their intended use.

In one embodiment of the invention, the assembly of tubes and jacket-elements forms a substantially helicoidal reaction vessel. In another variant, the assembly is in the form of a coil made up of straight tubes and interconnecting elbow-tubes.

It is possible to construct, in accordance with the invention, a chemical reaction vessel in which it is possible to carry out chemical reactions under pressures in excess of 5000 bars and at temperatures of the order of 300° C., it being possible for the pressure of the temperature-regulating fluid to exceed 100 bars. However, it will be obvious that it is possible to use a vessel constructed according to the invention to carry out reactions at lower temperatures and pressures.

The advantages obtained with vessels according to the invention are numerous. In particular, it is possible to remove the jacket-members in which the cooling fluid circulates. Moreover, it is possible to fit, by means of orifices provided in the thickened portions of the metal, gauges which are in contact with the fluids being reacted.

Finally, washers can be used which enable a seal to be obtained between the various components of the vessel, the resilient deformation of these joints being limited by fitting them into seats machined in the ends of the tubes forming the vessel.

The invention will be better understood from the following description given, by way of example only, with reference to the accompanying drawing, which shows a part of one form of a reaction vessel constructed according to the invention.

Referring to the drawing, the tubular reactor vessel 1 is of a certain thickness and through it there extends, longitudinally, a coaxial chamber. This tube 1, when being manufactured, was upset by forging so that its end underwent thickening as shown at 2. This upset portion is machined on the outside to obtain a portion of cylindrical form.

A screw-thread 3 is provided on one part of the cylindrical surface of this upset portion and a second screw-thread 4 is provided nearer the end. A jacket-member 5 is fitted around the tube; a first intermediate member 6 is then screwed on to the thread 3 and then a second intermediate member 7 which locks the first one; a flange-member 8 is mounted on these two intermediate members, which flange-member contains a number of drilled holes which are brought into register with holes provided in the end of the jacket-member 5; bolts 9 are passed into the holes and the jacket-member 5 and the flange-member 8 are brought together by means of the bolts; previously, two seals 10 have been fitted, one providing a seal between the jacket 5 and the intermediate member 6, the other providing a seal between a cylindrical bearing face provided on the tube 1 and the intermediate member 6.

There is then screwed on to the thread 4, a flange-member 11 which contains a number of holes into which are inserted bolts 12 which firmly connect the flange-member 11 to the flange-member 15 which is identical therewith but is carried by the adjacent tube 14; a bolted flange system is thus obtained by means of which a sealing ring 13 is secured once it has been fitted within the tube, the system being continuous and fully resistant to pressure. This system can be readily dismantled.

There is thus provided a reaction chamber which is located inside a high-pressure tube 1 and is surrounded over the major part of its length by a heating enclosure defined by the tube and the jacket 5. This heating enclosure can be subjected to a relatively high pressure, which may amount to 100 bars.

In any particular case, the tube 14 may be a single-bend or multi-bend elbow, thus enabling a reaction vessel in the form of a coil to be obtained if desired.

The reaction vessel described above is particularly well suited as a reaction vessel for the polymerization of ethylene.

A vessel of the form described can be used both for the reaction vessel proper and for the various items of apparatus used in the supply lines of the reaction vessel, such as for example, the heat-exchangers fitted as the outlets of the compressors.

What we claim is:
1. A tubular chemical reaction vessel in which a mixture being reacted circulates from an inlet end to an outlet end, enabling reactions to be carried out under high pressure and at controlled temperature, constituted by a series of cylindrical tubes surrounded by jackets, said tubes and jackets at the ends thereof being firmly interconnected by coupling means providing fluid-tight joints, said coupling means comprising: a flange rigid with the outer surface of the tube disposed adjacent to but spaced a short distance from the end thereof and having a sealing face directed toward the adjacent end of the tube; screw threads formed on the outer surface of the tube adjacent to said face and spaced radially inwardly thereof, the end of the jacket surrounding the end of the tube having a sealing face directed toward the adjacent end of the tube; an intermediate member having threads cooperating with the tube screw threads being threadedly mounted thereon and having a first surface disposed adjacent to and facing said sealing face of the tube and a second surface disposed adjacent to and facing said sealing face of the jacket; a first sealing ring mounted in sealing engagement between said first surface and the tube sealing face and a second sealing ring mounted in sealing engagement between said second surface and the jacket sealing face; said intermediate member being threaded onto the screw threads clamping the first sealing ring in sealing engagement between said first surface and the sealing face on the tube and means clamping the jacket sealing face and the second surface of the intermediate member in sealing engagement against opposite sides of the second sealing ring.

2. A tubular chemical reaction vessel according to claim 1 in which said flange sealing face, said jacket sealing and said first and second surfaces of the intermediate member are radial.

3. A tubular chemical reaction vessel according to claim 2 in which said intermediate member includes a radially extending peripheral flange, said second radial sealing surface being formed on said peripheral flange, said clamping means including an annular flange encircling the tube and engaging the surface of the peripheral flange on the side thereof opposite said second radial sealing surface and threaded bolts passing through aligned openings formed in said annular flange and in the end of the jacket.

4. A tubular chemical reaction vessel according to claim 1 wherein the cylindrical tubes have dimensions such that the outside diameter to inside diameter ratio is in excess of 1:4.

5. A tubular chemical reaction vessel according to claim 3 in which threads are formed on the outer surface of the tube at the end thereof and a coupling flange having threads cooperating with the tube end threads is threadedly mounted thereon for coupling the end of the tube to an adjacent tube end.

6. A tubular chemical reaction vessel according to claim 5 wherein the threads at the tube end are smaller in diameter than said screw threads and the tube end threads are spaced axially on the tube from the said screw threads.

7. A tubular chemical reaction vessel according to claim 6 in which the radial end of the tube includes a seat for a sealing gasket.

8. A tubular chemical reaction vessel according to claim 1 wherein the bore of the tube is substantially uniform from end to end thereof; the portion of the wall of the tube at the end coupling means is integral with the tube and is of greater thickness than the intermediate portion of the tube, and said flange and said screw threads are formed on the integral portion of the greater thickness.

9. A tubular chemical reaction vessel according to claim 8 wherein the intermediate portion of the tube has dimensions such that the outside diameter to inside diameter ratio is in excess of 1:4.

References Cited

UNITED STATES PATENTS

| | | | |
|---|---|---|---|
| 1,258,166 | 3/1918 | Vollmann | 285—414 X |
| 1,404,787 | 1/1922 | Moody | 285—370 X |
| 2,374,574 | 4/1945 | Adams | 285—368 X |
| 2,449,052 | 9/1948 | Brown | 285—368 X |
| 2,568,414 | 9/1951 | Russ | 285—414 X |
| 2,838,073 | 6/1958 | Mattia et al. | 285—412 X |
| 3,118,693 | 1/1964 | Wallace | 285—412 X |
| 3,317,221 | 5/1967 | Brown | 285—175 X |

FOREIGN PATENTS 718,302  11/1954  Great Britain.

DAVID J. WILLIAMOWSKY, Primary Examiner

WAYNE L. SHEDD, Assistant Examiner

U.S. Cl. X.R.

285—363, 412, 414